US010127761B2

(12) United States Patent
Woels et al.

(10) Patent No.: US 10,127,761 B2
(45) Date of Patent: Nov. 13, 2018

(54) ELECTRONIC GAMING AND/OR ENTERTAINMENT DEVICE

(71) Applicant: NOVOMATIC AG, Gumpoldskirchen (AT)

(72) Inventors: Martin Woels, Vienna (AT); Marek Gawel, Traiskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 427 days.

(21) Appl. No.: 14/760,841

(22) PCT Filed: Jan. 14, 2013

(86) PCT No.: PCT/EP2013/000092

§ 371 (c)(1),
(2) Date: Sep. 28, 2015

(87) PCT Pub. No.: WO2014/108141

PCT Pub. Date: Jul. 17, 2014

(65) Prior Publication Data

US 2016/0055703 A1 Feb. 25, 2016

(51) Int. Cl.

*A63F 13/90* (2014.01)
*G07F 17/32* (2006.01)
*G07F 17/34* (2006.01)

(52) U.S. Cl.

CPC ...... *G07F 17/3213* (2013.01); *G07F 17/3209* (2013.01); *G07F 17/3216* (2013.01); *G07F 17/34* (2013.01)

(58) Field of Classification Search

CPC ............. G07F 17/3213; G07F 17/3209; G07F 17/3216; G07F 17/34

(Continued)

(56) References Cited

U.S. PATENT DOCUMENTS 7,066,816 B2 6/2006 Gauselmann
7,140,963 B2 11/2006 Kojima (Continued)

FOREIGN PATENT DOCUMENTS

AT 6316 8/2003
CN 1669610 9/2005

(Continued)

OTHER PUBLICATIONS

Benko et al. Microsoft Research and Department of Computer Sience 2008, 10 Pages. "Sphere: Multi-Touch Interactions on a Spherical Display".

(Continued)

*Primary Examiner* — Allen Chan
(74) *Attorney, Agent, or Firm* — Brooks Kushman P.C.

(57) ABSTRACT

A gaming and/or entertainment device, in the form of a coin or token-operated slot machine and/or gambling device, having a plurality of separate display units for displaying game information. At least one of the display units is provided with a touch panel for inputting control commands by touch. The touch panel is of continuous design over, in each case, at least part of at least two different display units, at least one display unit of which has a concave display surface. As a result of the touch panel extending over the boundary region or the intermediate space between two display units, it is possible, despite the use of a plurality of display units, to obtain a continuously closed-off device front. The design of the corresponding device wall is simplified and the protection against penetration into the housing at gap areas is increased.

16 Claims, 7 Drawing Sheets

(58) Field of Classification Search
USPC .......................................................... 463/20
See application file for complete search history.

(56) References Cited

U.S. PATENT DOCUMENTS

| | | | |
|---|---|---|---|
| D560,725 | S | 1/2008 | Johnson |
| 7,479,065 | B1 | 1/2009 | McAllister et al. |
| 7,815,507 | B2 | 10/2010 | Parrott et al. |
| 8,241,124 | B2 * | 8/2012 | Kelly .................. G07F 17/3202 463/34 |
| 8,388,444 | B2 | 3/2013 | Graf et al. |
| 8,882,600 | B2 | 11/2014 | Okada et al. |
| 8,888,591 | B2 | 11/2014 | Dos Santos et al. |
| 2002/0025852 | A1 | 2/2002 | Alcorn et al. |
| 2002/0065132 | A1 | 5/2002 | Stephan |
| 2002/0183105 | A1 | 12/2002 | Cannon et al. |
| 2004/0029693 | A1 | 11/2004 | Lind et al. |
| 2005/0020358 | A1 | 1/2005 | Cram |
| 2005/0113163 | A1 | 5/2005 | Mattice et al. |
| 2005/0192085 | A1 | 9/2005 | Iwamoto |
| 2005/0288097 | A1 | 12/2005 | Rasmussen |
| 2006/0100013 | A1 | 5/2006 | Enzminger |
| 2006/0189392 | A1 | 8/2006 | Okada |
| 2007/0004513 | A1 | 1/2007 | Wells et al. |
| 2007/0207861 | A1 | 9/2007 | Gawel et al. |
| 2008/0004104 | A1 | 1/2008 | Durham et al. |
| 2008/0055491 | A1 | 3/2008 | Gordon et al. |
| 2008/0102916 | A1 | 5/2008 | Kovacs et al. |
| 2008/0113755 | A1 | 5/2008 | Rasmussen et al. |
| 2008/0268944 | A1 | 10/2008 | Wudtke |
| 2008/0280667 | A1 | 11/2008 | Chun |
| 2009/0017897 | A1 | 1/2009 | Fujimoto et al. |
| 2009/0069066 | A1 | 3/2009 | Yoshizawa |
| 2009/0069069 | A1 | 3/2009 | Crowder, Jr. et al. |
| 2009/0069070 | A1 | 3/2009 | Crowder, Jr. et al. |
| 2009/0075721 | A1 | 3/2009 | Pacey et al. |
| 2009/0109125 | A1 | 4/2009 | Young et al. |
| 2009/0149249 | A1 | 6/2009 | Sum |
| 2009/0176573 | A1 | 7/2009 | Dreyer |
| 2009/0258701 | A1 | 10/2009 | Crowder, Jr. et al. |
| 2009/0275382 | A1 | 11/2009 | Vallejo et al. |
| 2009/0325668 | A1 | 12/2009 | Kelly et al. |
| 2011/0136573 | A1 * | 6/2011 | McComb ................ A63F 13/08 463/31 |
| 2011/0209104 | A1 | 8/2011 | Hinckley et al. |
| 2012/0004030 | A1 | 1/2012 | Kelly et al. |
| 2012/0032896 | A1 | 2/2012 | Vesely et al. |
| 2013/0127776 | A1 | 5/2013 | Guard et al. |
| 2014/0309015 | A1 | 10/2014 | Aoki et al. |

FOREIGN PATENT DOCUMENTS

| | | |
|---|---|---|
| CN | 1810339 | 8/2006 |
| CN | 1969301 | 5/2007 |
| CN | 102209580 | 10/2011 |
| DE | 102007042632 | 3/2009 |
| DE | 102008060702 | 6/2010 |
| EP | 1246143 | 10/2002 |
| EP | 1953632 | 8/2008 |
| EP | 2189954 | 5/2010 |
| EP | 2535880 | 12/2012 |

OTHER PUBLICATIONS

International Search Report for PCT/EP2013/000092, English translation attached to original, Both completed by the European Patent Office dated Mar. 11, 2013, All together 5 Pages.
Chinese Search Report for Chinese Application No. CN 2013800737543, dated Mar. 16, 2017, 2 Pages.

* cited by examiner

ELECTRONIC GAMING AND/OR ENTERTAINMENT DEVICE

CROSS-REFERENCE TO RELATED APPLICATIONS

This application is the U.S. national phase of PCT Application No. PCT/EP2013/000092 filed on Jan. 14, 2013 the disclosure of which is incorporated in its entirety by reference herein.

TECHNICAL FIELD

The present invention relates to a gaming and/or entertainment device, in particular in the form of a coin-operated and/or token-operated gaming machine and/or gambling device, having a plurality of separate display units for displaying information, in particular contents of games and/or game information, wherein at least one of the display units is provided with a touch panel for inputting control instructions by touch.

BACKGROUND

Such gaming devices can form, for example, reel-spinning slot machines which are of electronic design and in which a plurality of rotating reels are represented in a rotating manner on a display unit with various gaming symbols and winnings are output if the reels with the same gaming symbols come to a stop along a winning line. In addition to the display unit, which represents the actual game, for example, in the form of the specified reels, at least one further display unit is often also provided which displays additional game information such as, for example, the winnings achieved, the game stakes and the like. The specified display units can be embodied, in particular, in the form of screens in order to be able to display electronically the specified contents of the game and game information, wherein here, in particular, a plurality of screens can be arranged one above the other in a housing which has an overall tower shape. Below the display units or screens it is possible here to provide, for example at stomach height of the player standing in front of the gaming device, an operator control panel with operator control elements such as coin slot, winning token printer and control keys such as control stake keys or a start/stop key which can be activated mechanically or in some other way by sensor and can serve, inter alia, to put rotating reels into operation or stop them. In such gaming devices, additional screens are not only installed in order to be able to display supplementary game information such as, for example, other gaming possibilities of the device or the status of other bets, but also in order to be able to allow different games to run at the same time, with the result that during less exciting sections of a game the player can be additionally entertained by the respective other screen.

In recent times, it has been proposed here to provide the screens or display units with touch panels in order to control the device by touching the display or individual display elements themselves, for example to activate or move display elements on one of the screens, for example to cause the representation of a roulette wheel to rotate or to stop the representation of a rotating reel. Document U.S. Pat. No. 7,479,065 B1 shows a reel-spinning slot machine device in which a touch panel is positioned above the display unit for displaying the reels, which can be embodied in the form of a screen or an actual mechanical reel arrangement, in order to be able to control the rotation of the reels by touching said touch panel. The controller assigned to the touch panel is embodied here in such a way that a device user can cause the reels to rotate correspondingly with a wiping finger movement along the touch panel. A sensor system which is assigned to the touch panel senses the specified wiping movement here, which movement is then converted by the controller into corresponding actuation of the reel drives or corresponding actuation of the screen display.

Further examples of gaming devices with touch screen operation are known from documents AT 006 316 U1, EP 1 953 632 A2, US 2004/0229693 A1 or US 2009/0069070 A1.

SUMMARY

If such gaming or entertainment devices have a plurality of screens which are embodied as touch screens in order to permit control instructions to be input in each case by touch, the embodiment of the housing or the encapsulation of the interior of the gaming machine is difficult. Since the touch panel surface has to be arranged in an exposed fashion in order to permit corresponding touch, the display units which are embodied as a touch panel cannot be enclosed behind a transparent housing panel, for example in the form of a large glass panel, since then, it would no longer be possible to touch the touch panel screens. In view of this, separate viewing windows are usually formed in the housing for the plurality of separate display units. However, this complicates the embodiment of the housing since consideration has to be given to various intermediate spaces between the individual display units. In addition, the problems of safety are exacerbated since the increased number of intermediate spaces and edge regions results in greater susceptibility to mechanical manipulations, for example by attempting to use a mechanical object such as a screwdriver to penetrate the joints between individual display units.

In addition, such touchscreen devices are capable of being improved in terms of the handling and visibility of the information displayed. As a result of the specified restrictions of the installation situation and the relatively rigidly predefined user position relative to the device, which is predefined by the operation by means of the touchscreen, light reflections on the screens can cause eye fatigue and adversely affect the visibility without the possibility of the user remedying this by simply stepping away or to the side, since the touchscreen operation capability would then no longer be possible.

The present invention is based on the object of providing an improved gaming or entertainment device of the type mentioned at the beginning which avoids disadvantages of the prior art and advantageously develops the latter. In particular, in the case of a gaming or entertainment device which has a plurality of separate display units with touch screen operation, the design of the device housing is to be simplified, the protection against mechanical manipulation is to be increased and good visibility without causing fatigue of the information displayed on the plurality of display units is to be achieved.

According to the invention, the specified object is achieved by means of a gaming and/or entertainment device as claimed in claim 1. Preferred embodiments of the invention are the subject matter of the dependent claims.

In order to solve the specified problem, it is proposed that a separate touch panel no longer be assigned to each individual display unit but instead that a common touch panel be provided for at least two display units which are arranged and embodied separately per se and that at least one of the display units be given a concave display surface. According to the invention, the touch panel is of continuous design over, in each case, at least part of at least two different display units, of which at least one display unit has a concavely curved display surface. As a result of the touch panel extending over the boundary region or the intermediate space between two display units, it is possible, despite the use of a plurality of display units, to obtain a continuously closed-off device front, as a result of which the design of the corresponding device wall is simplified and the protection against penetration into the housing at gap areas is increased. In this context, as a result of the curved embodiment of at least one display unit and an advantageously likewise curved embodiment of the touch panel, simple touch operator control can be combined with fatigue-free perceptibility of the presented information despite the fact that there are a plurality of display units.

In one development of the invention, a plurality of display units, in particular all the display units, can each be provided with concavely curved display surfaces, wherein the display units are advantageously matched to one another in respect of contouring, curvature and positioning, in such a way that the display surfaces form partial surfaces of a uniformly curved, overall harmonically contoured total display surface.

The touch panel can be embodied and arranged here, in particular, in such a way that information from various display units can be seen on the same touch panel and a plurality of display units can be actuated from the same touch panel by touching them. The touch panel therefore advantageously forms not only a cover which extends over a plurality of display units but also a functional unit which interacts with a plurality of separate display units and which permits interactive processing of information displayed on various display units. In this context, various parts or sections of the touch panel are located above various display units. While a first section of the touch panel is assigned exclusively to a first display unit and/or extends exclusively over the specified first display unit, a second section of the touch panel is assigned solely to a second display unit and/or extends solely over this second display unit. The various display units are located under various sections of the same touch panel.

The display units themselves can each form here assemblies which are independent per se and which can be embodied in an independently functionally capable fashion, apart from the common touch panel. In particular, the display units can form display assemblies which can be mounted and/or exchanged independently of one another and/or can have power supply parts which are embodied independently of one another and/or control modules which are embodied independently of one another and which control the display elements which are generated on the respective display unit. In the context of the present application, a display unit can be, in particular, a screen or a mechanical reel assembly with preferably two, three, four or more rotatable reels, wherein a screen which forms a display unit can be embodied flat in the sense of a conventional flat screen or bent in the sense of an electronic reel display screen.

In the context of the present invention, separate display units are therefore, in particular, independently functionally capable display assemblies which have display areas which can be seen or perceived independently of one another and each permit a complete display of a game which is self-contained. The display fields of the separate display units may be arranged transversely with respect to the viewing direction, offset one next to the other and/or one on top of the other and if appropriate also spaced apart from one another, wherein the display fields or display field portions or image portions of the separate display units, which can be seen from the device operator control station, are preferably located outside one another, in particular in such a way that a display field or image portion of a display unit which can be seen from the device operator control station lies outside the display field or image portion of the respective other display unit. Accordingly, the sections of the touch panel which are assigned to the separate display units are then also arranged outside one another considered from the device operator control station. The display units are, however, combined in terms of their arrangement and also in terms of their function by the common touch panel to the extent that the visible display areas of the display units are located at least partially under the common touch panel and/or the display of the plurality of display units can be changed by means of the common touch panel or control instructions relating to display elements on various display units can be influenced.

The touch panel in this context does not necessarily have to extend over the entire visible display area of the display units assigned to it, in particular if only part of the information made available on a display unit is provided for interactive processing on the display unit. However, the touch panel advantageously extends over a large area of the entire display area of all the separate display units assigned to the touch panel, wherein the touch panel can advantageously extend over a large are of the entire display region of the device, which entire display region is composed of the display regions of the various separate display units. If the display units of the gaming or entertainment device are arranged on the front side of the housing, in the upper region thereof, as can be the case, for example, in a so-called stand-alone device, the touch panel advantageously extends essentially over the entire upper front side of the device housing, wherein, if appropriate, a housing enclosure can be provided at the edges, as is the case, for example, with a door frame or window frame.

In an advantageous development of the invention, the gaming or entertainment device can comprise three separate display units which are preferably arranged one on top of the other, wherein the specified touch panel, being embodied here in a continuous and integral fashion, extends over the visible display regions of the three separate display units.

As a result of the use of a continuous touch panel, it is advantageously also possible to install display units of a different size and/or different format and/or different surface contouring in a variable fashion without particular adaptation of the device housing. In one development of the invention, the touch panel can extend over a plurality of display units which are of different designs and/or are arranged at different angles of inclination. As a result, a device surface which is contoured in a uniform or continuous fashion is obtained in the region of the display units even if display units which are curved differently or arranged offset with respect to one another or are different in relation to one another in the format are used. For example, planar screens and screens which are curved at the surface can be assembled with one another as display units, over which screens a uniformly contoured touch panel extends, with the result that said touch panel does not require an irregularly structured device housing wall.

In one development of the invention, the touch panel can be contoured in a planar but in particular also curved fashion, wherein combinations thereof can also be provided, for example in such a way that a panel section which is curved in an arcuate fashion adjoins a planar panel section. The use of a touch panel which has at least one curved panel section, independently of the previously explained features, entails particular advantages even in the case of devices with just one screen and permits, in particular, organic housing shapes which can be configured in a harmonious fashion, with no consideration for specific screen contouring, with smooth, in particular curved outer faces or viewing faces. According to one aspect of the invention, a touch panel with at least one section which has an at least single-axis curvature can extend, in particular, over a planar display area of a display unit of the interactive terminal. The interactive terminal can be here, in particular, a gaming and/or entertainment machine or gambling terminal, but also a money changing machine and/or money issuing machine or a token issuing machine or some other interactive terminal, in particular of the stand-alone type.

The curvature of the touch panel can be embodied here in a basically different way, for example in the form of a single-axis curvature about an upright curvature axis, essentially parallel to the longitudinal axis of the device, or in the form of a single-axis curvature about a horizontal curvature axis, approximately parallel to the transverse axis of the device housing. Alternatively, the touch panel can also have surface profiles which are curved around multiple axes, for example in the form of cushion-shaped contouring, or shell-shaped or trough-shaped contouring. For example, corner regions of the touch panel can be curved toward the operator control station, wherein a central region of the touch panel can advantageously be embodied in a planar fashion or can be embodied curved on a single axis.

In particular, a touch panel which is embodied in a concavely curved fashion can be installed extending over display units whose display surfaces are each likewise concavely curved in order to provide a uniform front region of the device housing facing the operator control station even given such an arrangement of display units, with simultaneous adaptation of the touch panel to the display units.

In one development of the invention, a plurality of display units, in particular all the display units, can each be provided with concavely curved display surfaces, wherein the display units are advantageously matched to one another in respect of contouring, curvature and positioning, in such a way that the display surfaces form partial surfaces of a uniformly curved, overall harmonically contoured total display surface.

The display units can be contoured with their display surfaces in such a way that they define a harmonically contoured enveloping surface which is concave at least in certain sections, for example in such a way that the specified enveloping surface forms a concave surface which is curved around a single axis, and the individual display units form partial surfaces of this enveloping surface with their display surfaces. The display surfaces which are adapted or matched to one another can continue in a constant fashion with respect to one another, if appropriate with the intermediate positioning of a gap, in particular can continue the curvature and orientation of the respectively adjacent display unit, without bends or discontinuities arising as a junction.

In one advantageous development of the invention, the plurality of display units can be curved with respect to one or more common curvature axes or with respect to a common curvature center point, for example in such a way that the plurality of display units are curved with respect to a common, horizontal, in particular transversely extending curvature axis. In the case of multi-axis curvature, the display units can advantageously be contoured with curvature with respect to a common curvature center point, in particular they conjointly form a spherical or concave display surface or a display surface which is contoured harmonically in the form of a shell.

In one development of the invention, the display units or the display surfaces thereof can have the same curvature radius at least in certain sections.

In one development of the invention, the touch panel which extends over the plurality of display units can also be embodied in the curved fashion and can be adapted to the curved surfaces of the display units, with the result that overall the touch panel fits snugly against the display surfaces of the display units. For example, the touch panel can extend continuously over three display units which are arranged one on top of the other and/or essentially over the entire gaming display region of the gaming and/or entertainment device, wherein the touch panel can have a curved contouring whose curvature profile can correspond essentially to the curvature profile of the surfaces of the display units.

In particular, the touch panel can be embodied in a curved fashion with single-axis curvature about a horizontal curvature axis.

In one development of the invention, the touch panel and the at least one concavely curved display unit can have a common curvature center point or a common curvature axis. In particular, the touch panel can extend in a continuously concavely curved fashion essentially over the entire display surface of the device and at the same time fit snugly against the display units which jointly form the specified total display surface, in such a way that the touch panel and display units each have curvatures whose curvature center points and/or curvature axes essentially coincide.

The curvature of the touch panel and/or the curvatures of the display units below it can basically be dimensioned differently and adapted to the respective device. According to an advantageous aspect of the present invention, the touch panel and/or the at least one concavely contoured display unit below it can have a curvature radius in the range from 0.5 m to 3 m, in particular 0.75 m to 1.5 m, and more preferably approximately 1.0 m to 1.25 m. As a result, good visibility with fatigue-free perception without disruptive reflections of light and at the same time simple operator control of the device by touching the touch panel can be achieved.

However, in one development of the invention the device can also comprise display units whose display surface is not concavely contoured.

For example, in the case of a reel-spinning slot machine device, it is possible for a display unit with a convex contour, in particular a barrel-shaped display unit, which permits realistic representation of the rotating reels, to be combined with an approximately level or a concave display unit which is arranged below or above the latter, and to be covered by a continuous, for example planar or uniformly curved touch panel. The specified barrel-shaped display unit can be, for example, a mechanical drivable reel arrangement or else a screen which is of curved design and which represents the rotating reels, while the planar display can serve for the display of additional information or of another game.

In one development of the invention, at least one of the display units covered by the touch panel can have a contour of the display surface which differs from the touch panel lying above it. The touch panel therefore does not have to identically follow the contouring of the display surface of the display unit lying below it but instead can be contoured independently thereof and spaced apart to a greater or lesser extent from the display surface of the display device lying below it, i.e. a uniform gap dimension between the display surface of the respective display unit and the touch panel located above it does not have to be provided either, wherein this nevertheless may be the case. The touch panel can in this context rest directly on the display surface of the display device located below it and be in contact therewith in a punctiform or linear or planar fashion. However, the touch panel can also be arranged spaced apart from the display device completely without contact.

In one development of the invention, various distances can be provided between various display units, on the one hand, and the touch panel, on the other, i.e. the display units can be installed spaced apart to different degrees from the touch panel, with the result that a relatively high degree of freedom is achieved with respect to the positioning of the display units, without having to accept a non-uniform front of the housing.

In one advantageous development of the invention, the touch panel is of transparent design, wherein the display units can have separate display surfaces, in particular screen surfaces, but also mechanical display surfaces in front of which the touch panel, which is of transparent design, extends. The touch panel therefore does not have to form the display surface of the respective display device. Instead, the touch panel is advantageously a separate assembly, wherein each display unit has its own display surface for displaying the respective information or display elements, for example in the form of a screen surface.

In order to achieve, from the device operator control station, good visibility conditions with low lateral light dazzle on the display units, in one advantageous development of the invention the plurality of display units can be arranged inclined at an obtuse angle with respect to one another, wherein, in particular, two or three screens which are each inclined at an obtuse angle with respect to one another can be arranged one on top of the other, with the result that the viewing axis of the device operator is incident in each case virtually perpendicularly on the respective display unit, with it being possible for one or all of the display units to also have a curved, in particular concave display surface. In one advantageous development of the invention, given such an arrangement of the display units at an obtuse angle, the touch panel is nevertheless embodied in a bend-free fashion in order to obtain a uniform front of the device and to avoid housing sections which are difficult to mold. In one particularly advantageous development of the invention, the touch panel can in this context have a concavely curved contour which fits snugly against or is close to a polygon-like profile, which is bent at an obtuse angle, of the display surfaces of the plurality of separate display units, for example similarly to an internal envelope circle which fits snugly against a polygon.

In particular, the contouring of the touch panel can be constructed in such a way that the distance of the rear side of the touch panel from the surface of the display units is smallest in the region of the central sections of two adjacent display units, while the distance from the surfaces of the display units increases toward the junction region of the display units and/or also increases toward the edges of the adjacent display units which face away from one another. The touch panel therefore fits most snugly against the central regions of the display units which are inclined at an obtuse angle with respect to one another.

If at least one of the display units is contoured in a convex fashion, in one development of the invention the touch panel which is located above it can have planar or concave contouring.

In one development of the invention, the touch panel can also extend continuously over two or more display units, in particular in the form of flat screens, one display unit of which is arranged concealed partially behind at least one other display unit considered from the device operator control station. Such a staggered arrangement of the display units with offsetting of the display surfaces into the depth of the device can be advantageous, in particular, when standard-format screens are to be used on the device to produce different viewing windows in different formats, for example one of the display units is to generate just one display region in the form of a narrow strip or an L-shaped display region even though the display device per se has a standard-format display region.

In order to be able to use the same touch panel for various arrangements of display units and to adapt it in terms of its contouring, in one advantageous development of the invention a touch panel which is of flexible design can be used, which touch panel can be deformed in such a way that the touch panel can assume various curvature profiles. Irrespective of whether in the installed state the touch panel is to assume planar contouring or contouring which is curved on one axis or curved on a plurality of axes, the same touch panel or type of touch panel can be used which on installation is deformed into the respectively desired curvature, for example by virtue of the fact that the touch panel is mounted on a correspondingly curved frame or carrier. Such deformable, preferably elastically flexible touch panels can be formed, for example, by touch-sensitive films which are applied to flexible carrier substrates such as, for example, transparent polycarbonate panels, for example are adhesively bonded by means of an adhesive tape which is adhesive on both sides. Such pressure-sensitive flexible films can be, for example, PET films, wherein an electrically conductive polymer layer can be applied to or incorporated in the pressure-sensitive film and/or between the film and the carrier substrate, by means of which polymer layer finger contact with the touch panel can be sensed.

The flexibility of the touch panel is advantageously embodied here in such a way that although the touch panel can be placed in the desired curved state by means of mounting steps, the touch panel is not subsequently deformed any further by correct finger pressure, at least not permanently, with the result that given correct usage the touch panel does not change its curvature further once the curvature has been defined by the mounting process. In particular, the touch panel can have a certain degree of tension and flexibility which keep the touch panel in the desired surface shape.

Irrespective of the arrangement of the display units in a staggered fashion, if appropriate, into the depth of the device, or irrespective of different surface contouring of the display units, in one advantageous development of the invention the touch panel forms a uniformly contoured, continuous transparent viewing panel over a large area, which viewing panel is mounted in front of the display units and is fitted into the device housing and/or forms the front region thereof, in particular above an operator control section of the device housing.

Irrespective of the specific embodiment of the plurality of separate display units, it is advantageous if the touch panel is embodied over a large area and is formed over at least more than 30% of the front side of the device facing the device operator. As a result, a standardized device housing can be used for various gaming device models, the "interior" of which is capable of being configured in a variable fashion, for example through the installation of display units which are contoured in various ways and/or different in terms of format. As a result of the large area of the touch panel, which in one advantageous development of the invention can also form more than 50% of the front of the housing facing the device operator, it is possible, depending on the device model, to install two or three or four or even more screens in the device housing without being restricted to excessively tight peripheral conditions in terms of the arrangement of the display units.

In order to permit the desired contact point to be easily touched when, under certain circumstances, there is even a relatively large offset or there are deviations of the profile of the touch panel surface from the display surface of the display units located below, without making the assignment of the surface section of the touch panel which is actually touched to a display field which is located below it too susceptible to faults, in one development of the invention a parallax-compensating device can be provided which corrects the viewing error which is produced by the specified offset or different curvature profile. The parallax-compensating device which is provided for this purpose may comprise, for example, sensing means for sensing the head position of a device operator and can assign a respectively sensed contact point position, in which, for example, a finger is in contact with the touch panel, in, as it were, different ways as a function of the sensed head position or to a display region, offset with respect to the contact point on the touch panel, of the display unit lying below it. The so-called parallax describes the physical or optical effect that, when there is an imprecisely perpendicular viewing axis onto the surface of a transparent medium, an object which is viewed in or behind the medium is not actually located precisely where it is seen. The parallax-compensating device allows for this phenomenon and corrects the viewing error as a function of a sensed head position or eye position of the device operator and of certain geometric peripheral installation conditions which can be stored in a memory.

In order, despite a separate embodiment of the display devices, to be able to use the continuous touch panel correctly and continuously beyond the boundaries of the display units, in one development of the invention the touch panel is assigned control means which permit display elements from a display unit to move to another display unit over intermediate boundaries or intermediate spaces of the display units. The continuous touch panel and the control device assigned to the touch panel and to the display units are configured in such a way that display contents, for example in the form of information windows, can be moved from one display unit to the other display unit by touching the touch panel. The control means which are assigned to the touch panel and to the display units can comprise, for this purpose, movement means by means of which a display element can be moved continuously over the display boundary and to another display element by the operator moving his finger or hand on the touch panel. Such a continuous movement process permits particularly intuitive operator control of the device. However, it would also alternatively or additionally be possible to bring about movement of display contents from the one display unit to the other display unit not by moving the finger on the touch panel but instead only by correspondingly tapping the touch panel, for example firstly in the region of the one display unit and then in the region of the other display unit. The representation of the movement process on the display units can be controlled here in various ways, for example in a digitally switching fashion such that the display ends on the one display unit and begins seamlessly, or with a chronological offset, on the other display unit. However, the movement process can advantageously be represented continuously along a corresponding path, with the result that the device user can follow the movement visually.

If the movement process is displayed continuously, in one development of the invention it is possible for the display of the display element which is to be moved to be blanked out in certain regions in the region of the junction between the two display units. Corresponding blanking means for blanking out various sections of the display element can take into account the gap dimension between the display units and blank out a correspondingly wide strip of the display element, wherein in each case another section is continuously blanked out in order to allow the transition of the display of the display element from one display unit to the other display unit to appear seamless, in particular in such a way that an ever larger region of the display element is blanked out on the display unit which the display element is leaving, while an ever smaller part of the display element is blanked out on the display unit to which the display element is being moved.

BRIEF DESCRIPTION OF THE DRAWINGS

The invention will be explained in more detail below on the basis of preferred exemplary embodiments and associated drawings. In the drawings.

DETAILED DESCRIPTION

Figure 1:
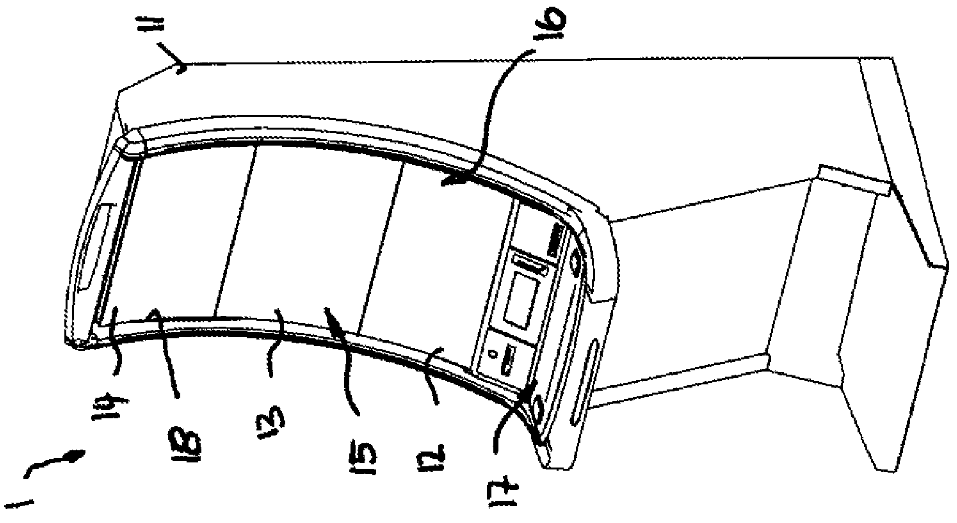
FIG. 1: shows a schematic, perspective partial view of a gaming device according to an advantageous embodiment of the invention, which device comprises three separate display units, arranged one on top of the other, in the form of screens which are arranged under or behind a common touch panel.

A gaming device 1 which is drawn in FIG. 1 forms a standing unit in the form of a stand-alone device and comprises a roughly box-shaped device housing 11 which is roughly the height of a man and whose upper half serves to accommodate a display device which comprises a plurality of separate display units which are independently functionally capable, and is composed in the illustrated embodiment of three screens which are arranged one on top of the other, wherein a first screen 12, a second screen 13 and a third screen 14 are each embodied as curved LCD-TFT displays. As is shown by FIG. 1, the gaming device housing 11 has for this purpose in its front side just a single window-like cutout 18 for all the specified screens. The specified cutout 18 in the device housing 11 defines here the game display region 16 in which the game contents, game information and, if appropriate, additional information are displayed with the plurality of display units 12, 13 and 14. The gaming device can serve, in particular, as an entertainment or slot machine, but also as a gambling terminal or else alternatively or additionally be embodied in the form of a money changing machine and/or money issuing machine or of a token issuing machine or in the form of some other interactive terminal, in particular of the stand-alone type.

Figure 2:
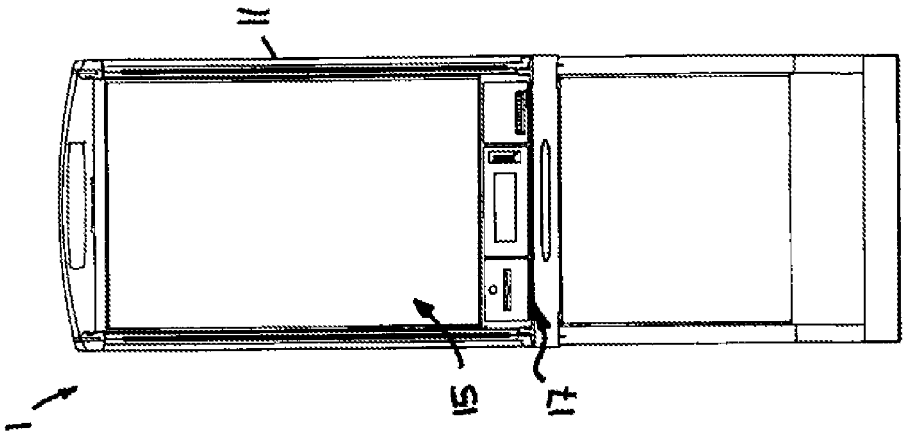
FIG. 2: shows a front view of the gaming device from FIG. 1, FIG. 3: shows a vertical section through the display region of the gaming device from the preceding figures, showing the concavely curved embodiment of the plurality of display units which are arranged one on top of the other and the likewise concave contouring, fitting snugly against the latter, of the touch panel lying above said display unit.

Underneath the screens 12, 13 and 14 or the cutout 18, the gaming device housing 11 has an operator control panel section 17 which projects toward the player and extends over the entire width of the device housing 11 and is embodied in an essentially box-shaped fashion, cf. FIGS. 1 and 2. The upper side of the operator control panel section of the device housing 1 is approximately of planar design and accommodates the operator control panel which can comprise a plurality of manually activated operator control keys in the form of pushbutton switches. In the embodiment illustrated, the operator control keys are mechanical switches but, of course, the operator control keys can also be activated according to other operational principles, in particular they can be part of a touch screen. In a manner known per se, the operator control section can also comprise a money inputting unit and/or money outputting unit which can, of course, be embodied in different ways in a manner known per se and can also comprise, in addition to a coin module and paper money module, for example a token module and/or ticket module, a voucher printer or an electronic card reading and writing device.

In addition, the operator control panel can have, on the front side of the operator control panel section, as well as a handle also a starting key and, on the planar upper side, a plurality of operator control keys, for example for increasing the game stake, for retrieving game information or for controlling further game functions.

The games which are displayed on the screens 12, 13 and 14 are controlled by an electronic control device, preferably in the form of a computer, which is accommodated in the interior of the device housing 11 in the lower half thereof. The control device actuates, on the one hand, the display device and communicates, on the other hand, with the operator control keys of the operator control panel. Of course, the device for outputting winnings is also actuated by the control device.

Figure 3:
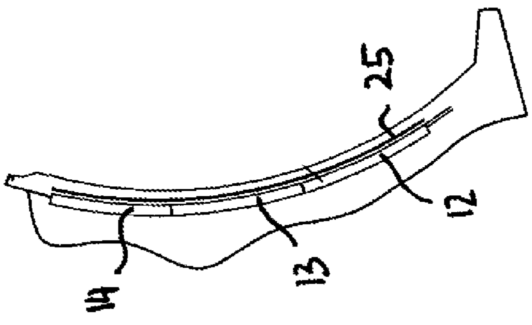

In the present case, a single continuous touch panel 25 is arranged in front of the specified screens from the device operator control station, which touch panel 25 extends over the separate screens or display units 12, 13 and 14 and covers them cf. FIG. 3.

A particular advantage here is that during the construction of the device housing it is not necessary to make any particular allowance for various intermediate spaces between the individual display units, in particular various intermediate webs can be eliminated, as a result of which the protection against mechanical manipulation is also increased.

As FIG. 3 shows, the display units 12, 13 and 14 can each be embodied curved in a concave fashion, wherein the curvatures of the display units can advantageously be matched to one another, with the result that the display units 12, 13 and 14 jointly define an enveloping surface which is contoured harmonically overall, or form partial surfaces of such an enveloping surface. In particular, the display units 12, 13 and 14 can be contoured in such a way that their display surfaces continue essentially in a continuous or bent-free and uniform fashion with respect to one another.

In one development of the invention, the specified plurality of display units 12, 13 and 14 can each have single-axis concave curvature about a horizontal, transversely extending curvature axis, wherein the curvature axes can advantageously coincide or lie approximately in the same region. In particular, the display units 12, 13 and 14 can be curved with a constant curvature radius with respect to a common curvature axis, with the result that the enveloping surface which is defined by display units 12, 13 and 14 can form a uniformly concavely curved, in particular cylindrical display surface. However, as will also be apparent from the further embodiments, the display units can, however, also have different curvature radii or the curvature radius can vary over one or more display units. For example, flat display units can also be combined with curved ones.

As FIG. 3 shows, the touch panel 25 can also be curved overall in a continuously concave fashion, wherein the curvature of the touch panel 25 is advantageously adapted to the curvatures of the display units 12, 13 and 14, with the result that the touch panel 25 fits at least to a certain extent snugly against the specified display units 12, 13 and 14.

In particular, an at least approximately constant small gap can be provided between the touch panel 25 and the display surfaces of the plurality of display units, which gap is advantageously just a fraction of the thickness of the display units, for example, in the region of the thickness of the touch panel 25. As an alternative to such spacing, the touch panel 25 can also rest in the planar fashion on the display units.

The touch panel 25 is advantageously also curved about a horizontal, transversely extending curvature axis, preferably with a constant or at least only harmonically changing curvature radius. In particular, the touch panel 25 can be curved with respect to a curvature axis which coincides with the curvature axes of the display units 12, 13 and 14 or lies at least in the region thereof.

Figure 4:
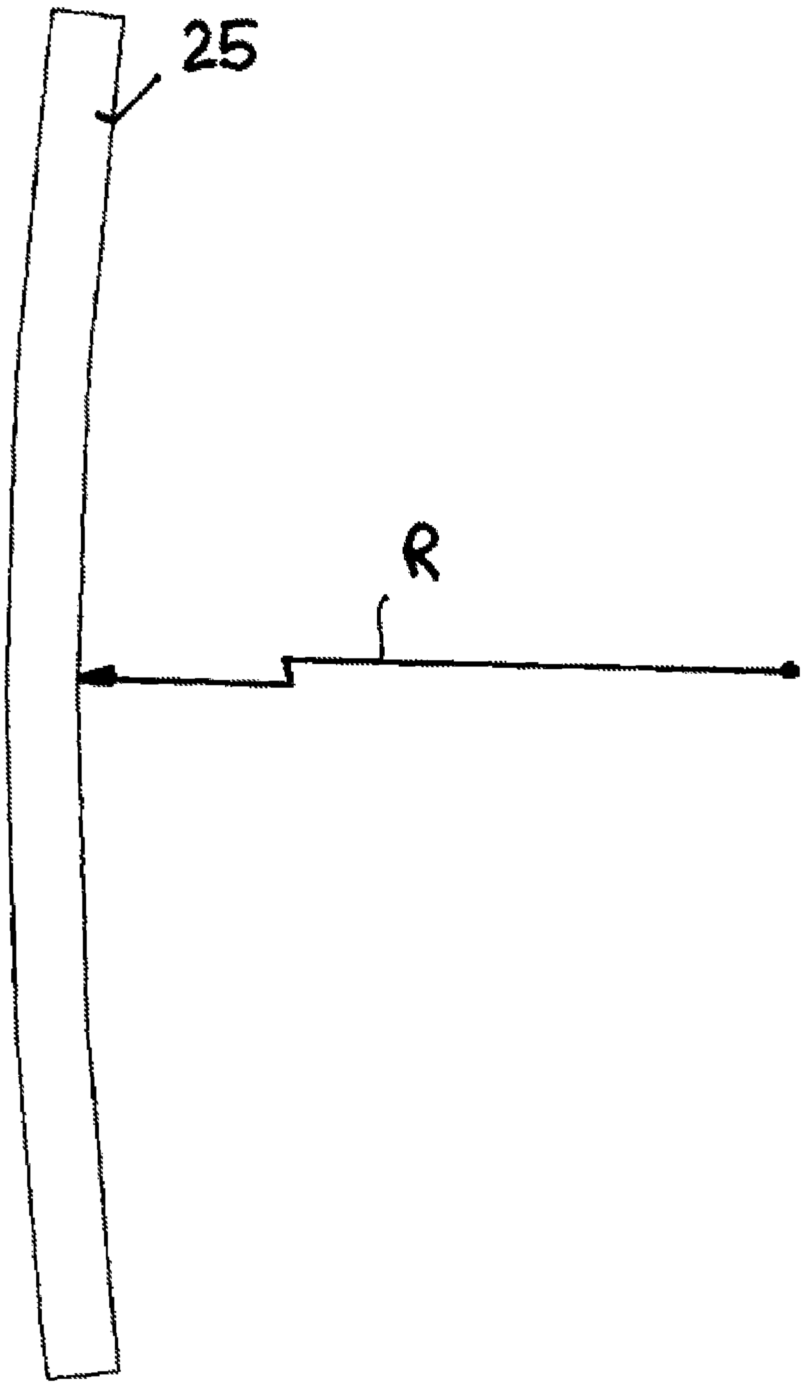
FIG. 4: shows a sectional view of the touch panel of the gaming device from the preceding figures, which touch panel shows the concave curvature of the touch panel.

As FIG. 4 shows, the touch panel 25 can have single-axis curvature and at the same time have a constant curvature radius R which is advantageously in the range from 0.5 to 3 m, in particular can be approximately 1.0 to 1.25 m.

Figure 5:
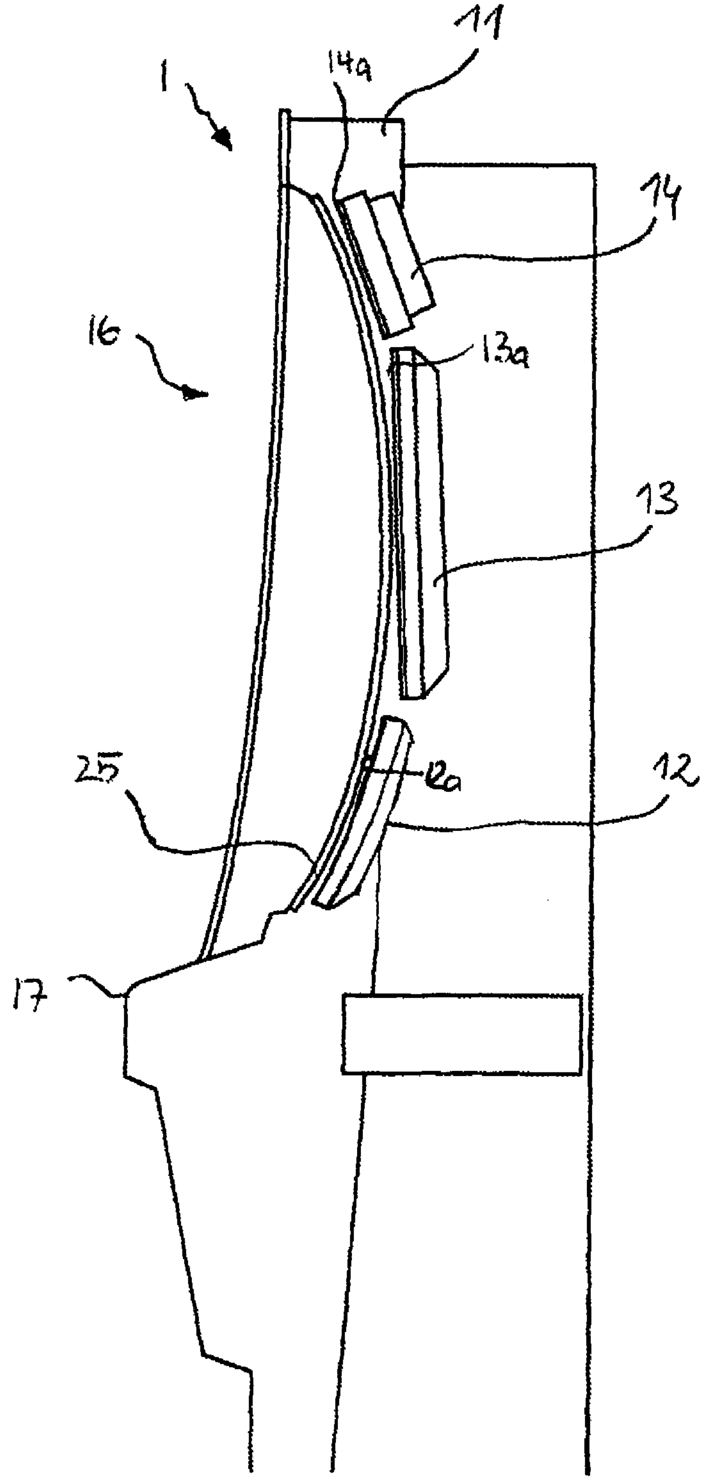
FIG. 5: shows a vertical section through a gaming device similar to FIG. 3, in which two screens which are arranged one on top of the other are arranged at an obtuse angle with respect to one another, and a third concavely curved screen which is arranged below is arranged, and a concavely curved touch panel is provided which fits snugly against the arrangement of the display units.

A gaming device 1 according to a further exemplary embodiment is shown in FIG. 5. In the present case, a touch panel 25 similar to that shown in FIG. 2 is arranged, wherein the touch panel 25 is embodied in a curved fashion, in particular the touch panel 25 has a concave curvature. In this context, a correspondingly concavely curved screen 12 is combined with two display units 13 and 14 which are embodied in a planar fashion and which are at an oblique angle with respect to one another and are positioned along the curved touch panel, with the result that the concave touch panel 25 fits snugly against the curved first screen and the further flat screens 13 and 14.

Figure 6:
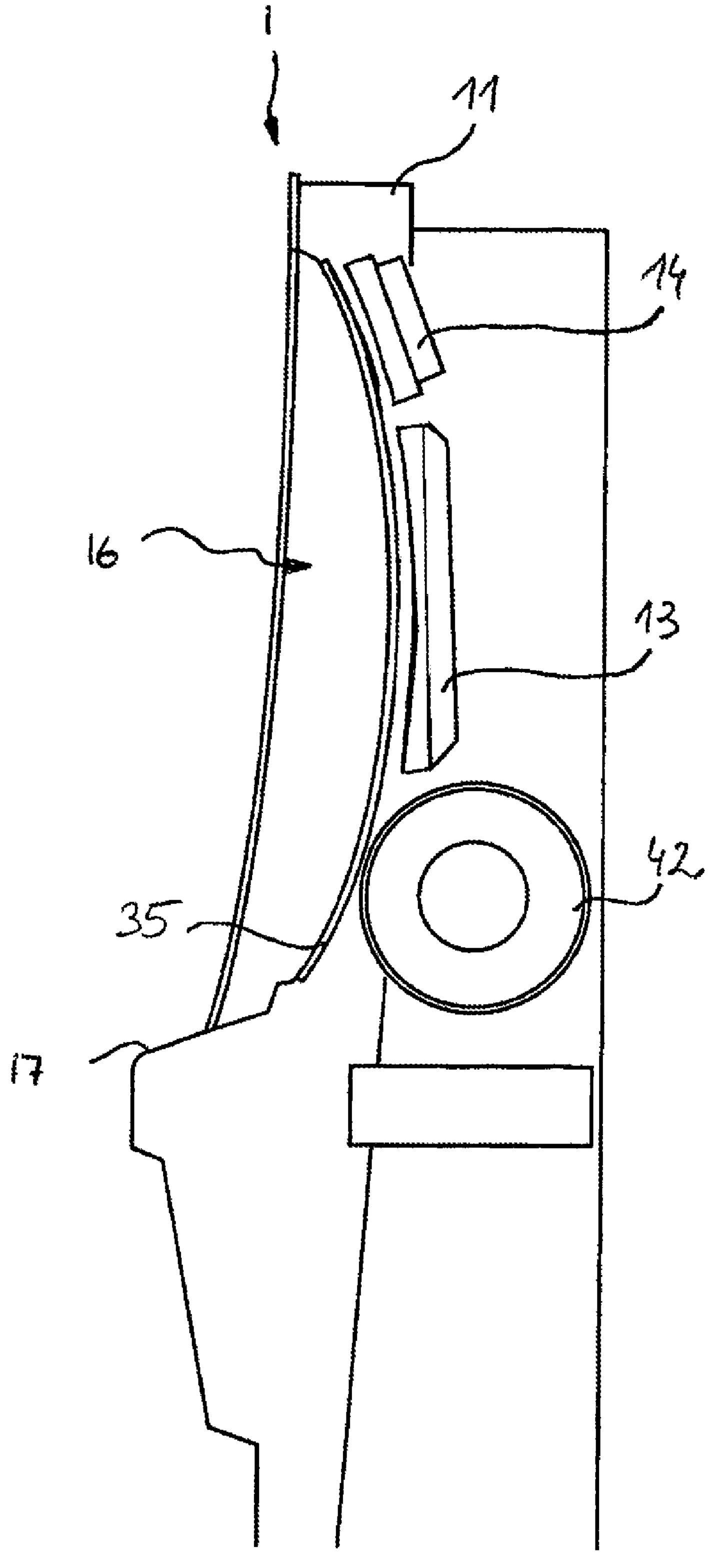
FIG. 6: shows a longitudinal section through a gaming device similar to FIG. 3, wherein in comparison to the embodiment in FIG. 3 the lower display unit for displaying rotating reels is not formed by a screen which is curved in a barrel-like fashion but rather by a mechanical reel arrangement.

According to a further exemplary embodiment, instead of a screen 12 a mechanical reel arrangement 42 can be provided as the display unit, for example having three or five reels which are mounted one next to the other in such a way that they can rotate about a common axis, as is shown in FIG. 6. Otherwise, these embodiments correspond to those in FIGS. 2 and 3.

Figure 7:
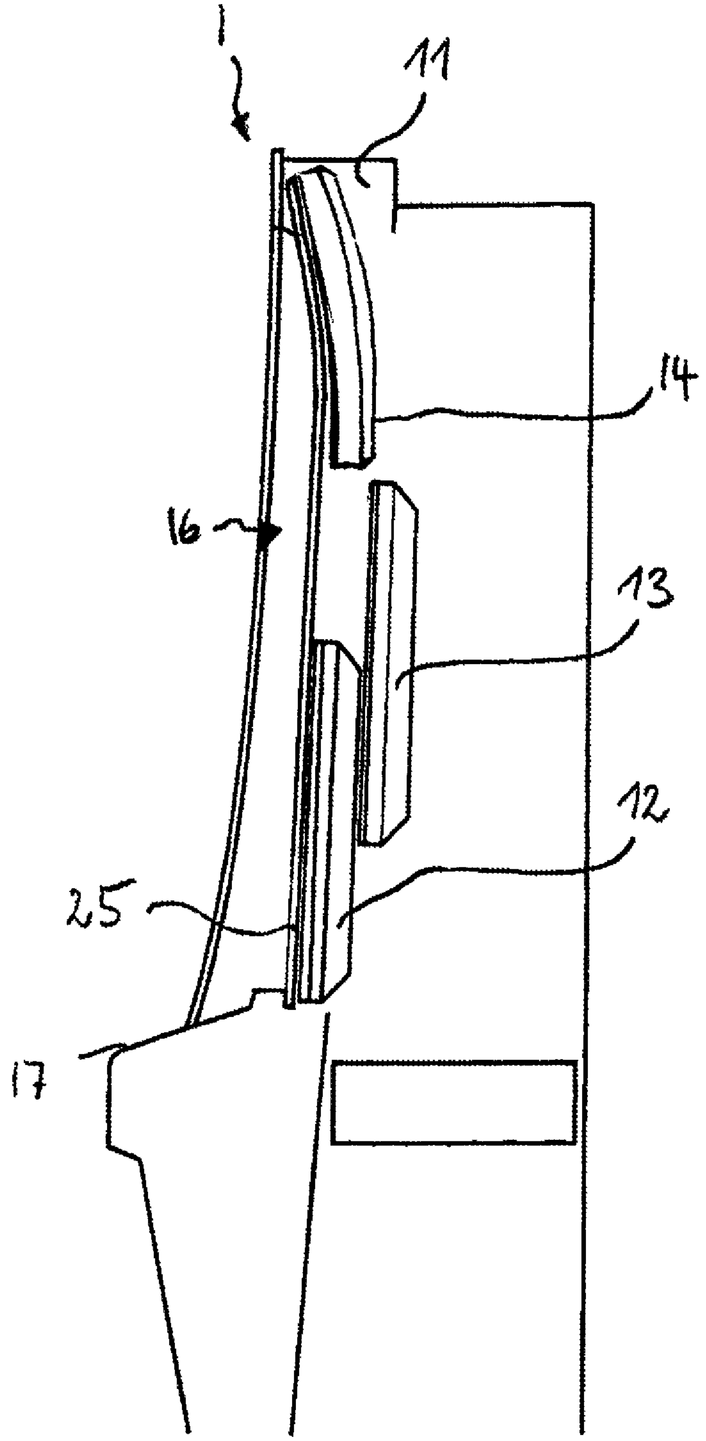
FIG. 7: shows a longitudinal section through a gaming device similar to FIG. 3, wherein three screens which are arranged one on top of the other are provided, the lower two of which are arranged offset one behind the other when considered from a device operator control station, and a third upper screen is concavely contoured, and the touch panel comprises a planar section and a concave section which continuously adjoins the latter and fits snugly against the upper screen.

According to a further exemplary embodiment, which is shown in FIG. 7, the second screen 13 and a third screen 14 are arranged offset and staggered one behind the other, with the result that the screen 14 extends partially behind the screen 13 and is partially covered thereby. In this context, the second screen 13 is, in rough terms, arranged essentially immediately below or on the front side of the device in a front screen plane, while the concealed screen 14 is arranged offset deeper into the device body in the direction of the viewing axis onto the screen, with the result that part of its screen surface is concealed behind the screen 13 in the direction of the viewing axis onto the screen. This concealed screen arrangement allows a normal-format screen to be used despite the unusually shallow (in the vertical direction) but wide viewing window or cutout. All/the two screens 13 and 14 which are offset with respect to one another or conceal one another are advantageously in the same format. In particular, they can be embodied as flat screens, for example in the form of TFT monitors.

According to FIG. 7, two screens 12 and 13 which are arranged offset or staggered one behind the other in the depth direction of the housing also can be combined with a third screen 14 which is arranged tilted with respect thereto and/or is curved. As is shown by FIG. 7, the first screen 12 and the second screen 13 are arranged offset or staggered one behind the other, with the result that the second screen 13 is arranged concealed partially behind the screen 13. The specified second screen 13 is arranged offset here deeper into the device body in the direction of the viewing axis onto the screen, with the result that a lower section of its screen surface is concealed behind the first screen 12 in the direction of the viewing axis onto the screen. The upper third screen 14 meanwhile adjoins the specified second screen 13 without being concealed, wherein the lower longitudinal edge of the upper screen 14 extends approximately parallel along the upper longitudinal edge of the central screen 13, with it also being possible, however, for the upper screen 14 to be arranged so as to cover a part of the screen 13. The specified upper, third screen 14 is of curved, in particular concave, design and as a result tilts forward out of the plane of the second screen 13, cf. FIG. 7, similarly as is the case in the embodiment according to FIG. 5. However, as an alternative to or in addition to the curvature of the screen 14, the partially concealed screen 13 and/or the further screen 12 can also be embodied in a curved, in particular concave fashion, for example with single-axis curvature about a horizontal transverse axis similarly to screen 14.

As is shown by FIG. 7, the touch panel 25 which extends continuously over all the screens 12, 13 and 14 can also comprise sections which are curved in different ways, for example as shown in FIG. 7 a planar lower section as well as a continuously adjoining concavely curved upper section, which, in the embodiment according to FIG. 7, fits snugly against the upper screen 14 which is curved forward. Irrespective of the tilting of the screens and/or their depth offset, the touch panel 25 can have such an arrangement or else another arrangement of sections which are curved differently or are planar, wherein the touch panel 25 is preferably embodied in a continuously contoured fashion without bending points.

According to a further aspect of the invention, a curved profile of the touch panel 25 is provided, for example as in the case of the arrangement of the screens as shown in FIG. 3, or also of another arrangement of a plurality of screens, for example four or more, wherein advantageously the curvature is embodied about a transverse axis of the gaming device. The curvature can be embodied at least partially in the form of an arc or oval.

According to a further aspect of the invention, a curved profile of the touch panel 25 about a longitudinal axis of the gaming device may be advantageously provided. Alternatively, a curvature of the touch panel 25 both about the transverse axis and about the longitudinal axis is possible, wherein, for example, a cushion-shaped embodiment of the touch panel 25 can be achieved, in which cushion-shaped embodiment, for example, the corner regions of the touch panel 25 are curved toward the operator control station.

The control of the touch panel can comprise a parallax-compensating means for compensating a coordinate position, with the result that a parallax compensation given different arrangements of the screens, in particular given a screen which is offset into the depth, is permitted for a user of the touch panel. The parallax-compensating device can comprise here sensing means which can be arranged, for example, on the device housing, in particular the front side thereof, and which sense the head position and/or eye position of a device operator standing in front of the device, in order to be able to perform the parallax compensation as a function of the sensed eye position or head position. The parallax-compensating device uses here not only the sensed head position or eye position but also stored geometry parameters which characterize the position of the screens in relation to one another and in relation to the touch panel 25 and/or the contouring of the touch panel 25 and/or the contouring of the display surfaces of the display units 12, 13, 14 and 15.

Figure 8:
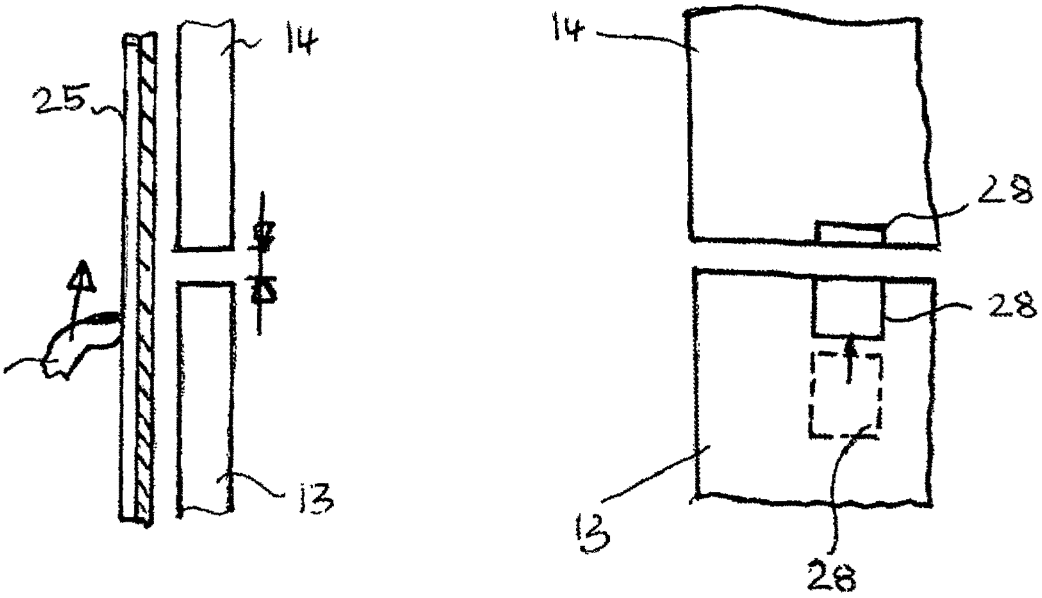
FIG. 8: shows a schematic portion of a sectional view of the junction region between two separate screens, over whose boundaries a display element can be moved from one screen to the other in that a finger is moved over the boundary section on the touch panel.

The control of the touch panel is also adapted in such a way that, for example, continuous movement of a graphic element, for example from the first screen 12 to the second screen 13 or third screen 14 or further screen 15, is made possible, as is illustrated by FIG. 8. In this context, control means 26 for controlling the position of display elements on at least two different display units 13 and 14 can be assigned to the touch panel 25, wherein the specified control means 26 advantageously have movement means 27 for moving a display element 28 from one display unit to another display unit over the boundaries lying between them. The specified movement means 27 can advantageously comprise here blanking control means for blanking out various sections of the display element, wherein the blanking control means advantageously take into account a gap dimension between the display units 13 and 14 during the determination of the blanked-out section. In particular, an approximately strip-shaped planar piece can be blanked out of the display element which is to be moved, which planar piece corresponds in its height approximately to the gap dimension between the display units, cf. FIG. 8.

The electronic device can be configured using any suitable hardware and/or software. According to one embodiment, the electronic device can comprise: the specified touch panel 25, a touch controller which is coupled to the touch panel 25 as well as a system control logic coupled to: the touch controller, at least one processor, a system memory, a nonvolatile memory and/or memory device, and one or more communication interfaces. A communication interface is embodied as a respective video interface with the respective screens, on which screens graphic elements can be displayed.

The touch panel 25 with the touch controller is provided and designed, in particular, for making available detected position information.

The touch panel 25 can be formed in each case using a suitable touch-sensitive technology such as, for example, and without restriction, capacitive, resistive, acoustic surface waves (SAW), infrared and visual imaging.

It is not absolutely necessary to physically touch the touch panel 25 here but instead it is equally possible for the presence of an object near to the surface to be detected.

The movement of a displayed element 28 from one screen 13 to an adjacent screen 14 can comprise coordinate calculation which takes place at continuous intervals, wherein the respective current position information of the detected touching of the touch panel is taken into account. The calculations can be performed in pixel units. If the graphic element starts to move over the screen edge during the movement process, that region of the graphic element which, as it were, projects beyond one screen edge can be blanked out, specifically over the distance from the adjacent screen edge.

Figure 9A:
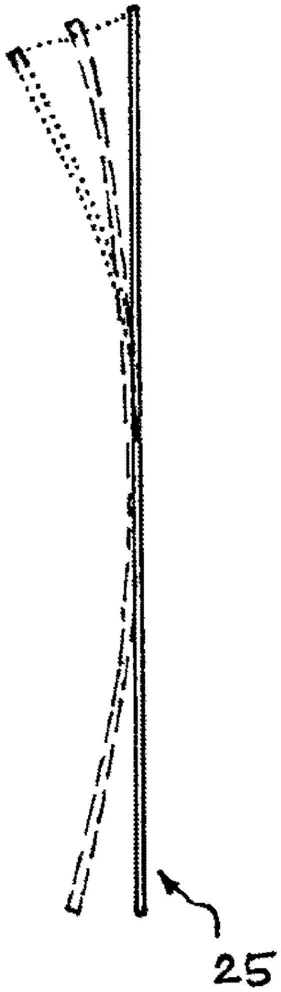
FIGS. 9A and 9B: shows a schematic illustrations of a touch panel which is embodied in a flexible fashion, in side views and plan views which each show various curvature states of the flexible touch panel.
Figure 9B:
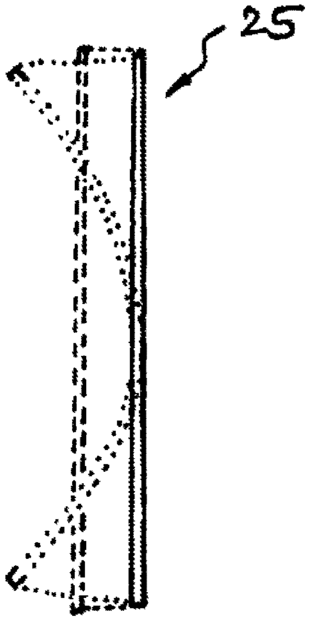

As is shown by FIG. 9, in an advantageous development of the invention of the touch panel 25 can be of flexible design, with the result that the touch panel 25 can assume various curvature profiles and can be installed in various curvature profiles in the device housing, wherein the touch panel 25 extends continuously over the separate screens or display units and covers them. FIG. 9A shows here a side view with an essentially horizontal viewing axis onto the touch panel, while FIG. 9B shows a plan view or a side view from above with an essentially vertical viewing axis. As is shown by the various bending states according to FIGS. 9A and 9B, the touch panel 25 can be curved on one axis or a plurality of axes in various directions, depending on the profile which the front surface of the device housing formed by the touch panel is intended to assume.

The invention claimed is:

1. A gaming and/or entertainment device having a plurality of separate display units for displaying information wherein the display units form independent assemblies and at least one of the display units is provided with a touch panel for inputting control instructions by touch, wherein the touch panel is of continuous design over, in each case, at least part of at least two different display units, at least one display unit of which has a concavely curved display surface viewed from the device operating position;

wherein the touch panel is assigned control means for controlling the position of display elements on at least two different display units, wherein the specified control means have movement means for moving a display element from one display unit to another display unit over the boundaries of the display units lying between them; and wherein the movement means has blanking control means for blanking out various sections of the display element in accordance with a gap dimension between the display units when the display element is moved over the boundaries of the display units.

2. The gaming and/or entertainment device as claimed in claim 1, wherein the touch panel extends continuously over a plurality of respectively concavely curved display units, wherein the respectively concavely curved display surfaces are advantageously matched to one another in respect of contouring, curvature and positioning, in such a way that the display surfaces form partial surfaces of a uniformly curved total display surface which is contoured harmonically overall.

3. The gaming and/or entertainment device according to claim 1, wherein the display surfaces of the plurality of display units each have, at least in certain sections, single-axis concave curvature about a horizontal curvature axis and adjoin one another harmonically, in particular are contoured with curvature about a common curvature axis and have the same curvature radius which remains constant over the respective display surface.

4. The gaming and/or entertainment device as claimed in claim 1, wherein the touch panel extends continuously over three display units preferably arranged one on top of the other and/or essentially over the entire game display region of the gaming and/or entertainment device.

5. The gaming and/or entertainment device according to claim 1, wherein the touch panel has at least one section which has contouring with at least single-axis curvature, wherein the touch panel is preferably embodied with continuous concave curvature, in particular with single-axis curvature about a horizontal curvature axis.

6. The gaming and/or entertainment device according to claim 1, wherein the touch panel and the at least one concavely curved display unit have a common curvature center point and/or a common curvature axis.

7. The gaming and/or entertainment device according to claim 1, wherein the touch panel extends with continuous concave curvature essentially over the entire display surface of the device and at the same time fits snugly against the display units which jointly form this display surface, in such a way that the touch panel and the display units each have curvature whose curvature center points and/or curvature axes essentially coincide.

8. The gaming and/or entertainment device according claim 1, wherein the touch panel has a curvature radius in the range from 0.5 m to 3 m.

9. The gaming and/or entertainment device as claimed in claim 1, wherein at least one of the display units covered by the touch panel has a display surface which has different contours from the touch panel lying above it and/or the touch panel extends over a plurality of display units which are of different designs in relation to one another and/or are arranged at different angles of inclination and/or are curved in a different fashion.

10. The gaming and/or entertainment device as claimed in claim 1, wherein the touch panel is of transparent design, and the display units have display surfaces, in particular screen surfaces, which are embodied separately from the touch panel and over which the touch panel, which is of transparent design, extends, wherein the touch panel is preferably spaced apart at least in certain sections from the display surface, a display unit located below it.

11. The gaming and/or entertainment device as claimed in claim 1, wherein the touch panel is of flexible design such that the touch panel can be placed in various states of curvature.

12. The gaming and/or entertainment device as claimed in claim 1, wherein the touch panel extends continuously over at least two screens, at least one screen of which is arranged concealed partially behind at least one other screen considered from the device operating position.

13. The gaming and/or entertainment device as claimed in claim 1, wherein the touch panel forms a transparent viewing panel which is mounted in front of the display units and which is fitted into a device housing and forms a front region of the device housing facing the device operating position.

14. The gaming and/or entertainment device as claimed in claim 1, wherein the touch panel extends over at least 30% of the surface of a housing front of the gaming and/or entertainment device facing a device operating position.

15. The gaming and/or entertainment device as claimed in claim 1, wherein the touch panel is assigned a parallax-compensating device which comprises sensing means for sensing the head position and/or eye position of a device operator and moves a respectively sensed contact point position on the touch panel as a function of the sensed head position and/or assigns it to a display element, offset with respect to the sensed contact point position, of the display unit.

16. The gaming device and/or entertainment device as claimed in claim 1, wherein the touch panel has at least one section which has a contour which is curved at least on one axis with a radius of curvature in the range from 0.5 m to 3 m, wherein the curved section of the touch panel extends over a level-contour display surface of the display unit.

* * * * *